United States Patent
Hsiao et al.

(10) Patent No.: US 12,267,413 B2
(45) Date of Patent: Apr. 1, 2025

(54) INTEGRATED CIRCUIT MODULE FUNCTIONING FOR INFORMATION SECURITY

(71) Applicant: InfoKey Vault Technology Co., Ltd., Taipei (TW)

(72) Inventors: Chih-Ping Hsiao, Taipei (TW); Chia-Jung Liang, Taipei (TW); Chihhung Lin, Taipei (TW)

(73) Assignee: INFOKEYVAULT TECHNOLOGY CO., LTD., Taipei (TW)

( * ) Notice: Subject to any disclaimer, the term of this patent is extended or adjusted under 35 U.S.C. 154(b) by 411 days.

(21) Appl. No.: 17/734,139

(22) Filed: May 2, 2022

(65) Prior Publication Data

US 2022/0353062 A1    Nov. 3, 2022

(30) Foreign Application Priority Data

May 3, 2021  (TW) ................................ 110115954

(51) Int. Cl.
   *H04L 9/08*    (2006.01)
   *H04L 9/32*    (2006.01)

(52) U.S. Cl.
   CPC ............ *H04L 9/0825* (2013.01); *H04L 9/085* (2013.01); *H04L 9/0869* (2013.01); *H04L 9/3278* (2013.01)

(58) Field of Classification Search
   CPC ..... H04L 9/0825; H04L 9/085; H04L 9/0869; H04L 9/3278; H04L 9/0841; G06F 21/85; G06F 21/78; G06F 21/602; G06F 21/606; G06F 21/72; G06F 12/14
   See application file for complete search history.

(56) References Cited

U.S. PATENT DOCUMENTS

| | | | |
|---|---|---|---|
| 8,452,012 B2 | 5/2013 | Aissi et al. | |
| 9,811,822 B2 | 11/2017 | Raboisson et al. | |
| 2012/0054498 A1 | 3/2012 | Rickman | |
| 2017/0288869 A1 | 10/2017 | Li et al. | |
| 2018/0332011 A1* | 11/2018 | Gray | H04L 9/0841 |
| 2019/0188397 A1 | 6/2019 | Benson | |

FOREIGN PATENT DOCUMENTS

| | | |
|---|---|---|
| EP | 3373508 | 9/2018 |
| JP | 2011182433 | 9/2011 |
| JP | 2012123807 | 6/2012 |

OTHER PUBLICATIONS

EESR issued on Sep. 29, 2022.
Japan Intellectual Property Office, OA issued on Jul. 4, 2023.
1 Taiwan Intellectual Property Office, OA issued on Sep. 27, 2022.

* cited by examiner

*Primary Examiner* — Izunna Okeke
(74) *Attorney, Agent, or Firm* — WPAT, PC

(57) ABSTRACT

An integrated circuit module functioning for information security includes: a secure circuit unit, which has passed a security evaluation as a cryptographic module and stores therein at least one digital key for providing a digital key service; and a controller unit set which is in communication with the secure circuit unit and includes a fast service unit and a trusted zone unit. The trusted zone unit and the secure circuit unit respectively use a first channel establishment key and a second channel establishment key dependent on each other to establish a secure signal channel. The secure circuit unit transmits a specific data to the fast service unit via the security signal channel to perform a fast service.

11 Claims, 4 Drawing Sheets

INTEGRATED CIRCUIT MODULE FUNCTIONING FOR INFORMATION SECURITY

FIELD OF THE INVENTION

The present invention relates to an integrated circuit module for information security, and more particularly to an integrated circuit module for information security in data storage and communication applications.

BACKGROUND OF THE INVENTION

With the popularization of information technologies, it is a common need for people to properly store digital information. However, a lot of important information, e.g., various accounts, passwords and confidential information, which is really required to keep confidential, are stored in information processing devices of users, such as common personal computers, notebook computers, or even more popular smartphones, together with ordinary information. Therefore, if the important information to be kept confidential are not properly stored, there is a high risk of being hacked and causing significant damage. In today's usage scenario, smartphones and similar portable information processing devices frequently use various data transmission channels, e.g., Universal Serial Bus (USB) interface, Bluetooth, or wireless network, to exchange data or conduct financial transactions with other information devices or servers on the cloud. Therefore, there is a need to encrypt and decrypt the important data sent or received. However, few information processing devices in the hands of users today have such functions, and only a few newly launched information processing devices may have data security modules built in to accomplish the function of secure data storage. Moreover, most of the existing information processing devices cannot have data encryption/decryption functions through simple installation.

SUMMARY OF THE INVENTION

The main purpose to develop technical means of the present invention is to solve the problems caused by the conventional means. The present invention principally relates to an integrated circuit module for information security, which includes: a secure circuit unit, which has passed a security evaluation as a cryptographic module and stores therein at least one digital key for providing a digital key service; and a controller unit set which is in communication with the secure circuit unit and includes a fast service unit and a trusted zone unit. The trusted zone unit and the secure circuit unit respectively use a first channel establishment key and a second channel establishment key dependent on each other to establish a secure signal channel. The secure circuit unit transmits a specific data to the fast service unit via the security signal channel to perform a fast service.

Based on the above idea, in the IC module for information security according to the present invention, the first channel establishment key and the second channel establishment key are derived from the digital key.

Based on the above idea, in the IC module for information security according to the present invention, the trusted zone unit contains a volatile memory. After the trusted zone unit uses a main key to perform an initialization process with the digital key provided by the secure circuit unit, a set of derived data is obtained from the digital key and the main key and stored back to the secure circuit unit. In the subsequent procedure of establishing the secure signal channel, the secure circuit unit sends the set of derived data to the trusted zone unit, and the trusted zone unit uses the main key and the set of derived data to restore the digital key and stores it in a volatile memory. After the trusted zone unit completes mutual verification with the secure circuit unit by way of the digital key, the trusted zone unit and the secure circuit unit use the digital key to derive the first channel establishment key and the second channel establishment key respectively. The secure signal channel, by way of the first channel establishment key and the second channel establishment key, has the specific data transmitted there via under encryption. The specific data obtained by the trusted zone unit is stored into the volatile memory. After the controller unit set is powered off, the digital key stored in the volatile memory will disappear, and the process of establishing the secure signal channel will be restarted once the controller unit is powered on.

Based on the above idea, in the IC module for information security according to the present invention, the first channel establishment key and the second channel establishment key are session keys of the same contents. The secure signal channel, by way of the session keys, has the specific data transmitted there via under encryption. The specific data contains a key for fast service for the fast service unit to perform the fast service.

Based on the above idea, in the IC module for information security according to the present invention, the mutual verification includes the following steps. The trusted zone unit issues a first challenge to the security circuit unit, which is a generated random number, and sends it to the security circuit unit. In response to the first challenge, the security circuit unit sends back a first response to the trusted zone unit, which is the random number encrypted with the digital key. The trusted zone unit then decrypts the first response based on the digital key to get back the decrypted random number, thereby determining whether the decrypted random number is the same as the generated random number. The security circuit unit issues a second challenge to the trusted zone unit, which is another generated random number, and sends it to the trusted zone unit. In response to the second challenge, the trusted zone unit sends back a second response to the security circuit unit, which is the another random number encrypted with the digital key. The security circuit unit then decrypts the second response according to the digital key to get back the decrypted another random number, thereby determining whether the decrypted another random number is the same as the generated another random number. The mutual verification is then completed.

Based on the above idea, in the IC module for information security according to the present invention, the trusted zone unit uses a secure technology of Physically Unclonable Function (PUF) to generate the main key.

Based on the above idea, in the IC module for information security according to the present invention, the trusted zone unit obtains a first public key pairing the digital key in the initialization process. A second public key of a second public-private key pair in the trusted zone unit is sent to the secure circuit unit, and stored in the secure circuit unit. The trusted zone unit uses a PUF secure technology to generate the main key, and uses the main key to conduct encryption protection of the second public-private key pair. The trusted zone unit uses a key establishment process to derive a share key from the first public key and a second private key of the second public-private key pair. The secure circuit unit uses the key establishment process to derive the share key from the second public key and the digital key. The secure circuit unit and the trusted zone unit then use a session key derived from the shared key to serve as the first channel establishment key and the second channel establishment key.

Based on the above idea, in the IC module for information security according to the present invention, the secure circuit unit is a secure integrated circuit chip, and the controller unit set is a controller integrated circuit chipset.

Based on the above idea, in the IC module for information security according to the present invention, the fast service unit is implemented with an AI chip, a field programmable gate array unit, or an application specific integrated circuit (ASIC) for conducting the fast service, which is a fast service via a changeable interface.

Another aspect of the present invention is a memory module exhibiting an information security function, which includes the above described integrated circuit module for information security and the following devices, including a non-volatile memory for storing digital information; and an interface controller in communication with the non-volatile memory, the integrated circuit module for information security, and a host for conducting digital data transmission between the non-volatile memory and the host, and using the fast service provided by the integrated circuit module for information security.

A further aspect of the present invention is a memory module exhibiting an information security function, which includes the above-described integrated circuit module for information security and a non-volatile memory for storing digital information. The integrated circuit module for information security is in communication with the non-volatile memory and a host for conducting digital data transmission between the non-volatile memory and the host, and providing the fast service.

Still another aspect of the present invention is a hardware module exhibiting an information security function, which includes the above-described integrated circuit module for information security and a communication controller. The communication controller is in communication with a host for conducting digital data transmission between the non-volatile memory and the host, and providing the fast service.

Based on the above idea, in the hardware module exhibiting an information security function according to the present invention, the communication controller is a network interface controller. The integrated circuit module for information security is further coupled to a network module. The network module is used for communicating with the external internet or mobile network. Data information transmitted between the host and a user device at the other end of the internet or mobile network are encrypted/decrypted by way of the fast service unit in the integrated circuit module for information security.

Based on the above idea, in the hardware module exhibiting an information security function according to the present invention, the integrated circuit module for information security and the communication controller are integrated in a housing to form the hardware module exhibiting information security and encryption/decryption functions. The integrated circuit module for information security conducts digital data transmission with a non-volatile memory in the host via the communication controller. The host transmits unencrypted information in the non-volatile memory to the fast service unit in the integrated circuit module for information security to be fast encrypted. The encrypted information is then transmitted back to the non-volatile memory in the host via the communication controller to be stored. The host transmits the encrypted information to the fast service unit in the integrated circuit module for information security to be fast decrypted. The decrypted information is then transmitted back to the non-volatile memory in the host via the communication controller to be stored.

In order to have a clear understanding of the above ideas of the present invention, a number of embodiments are given below with corresponding drawings as detailed below.

DETAILED DESCRIPTION OF PREFERRED EMBODIMENTS

Figure 1:
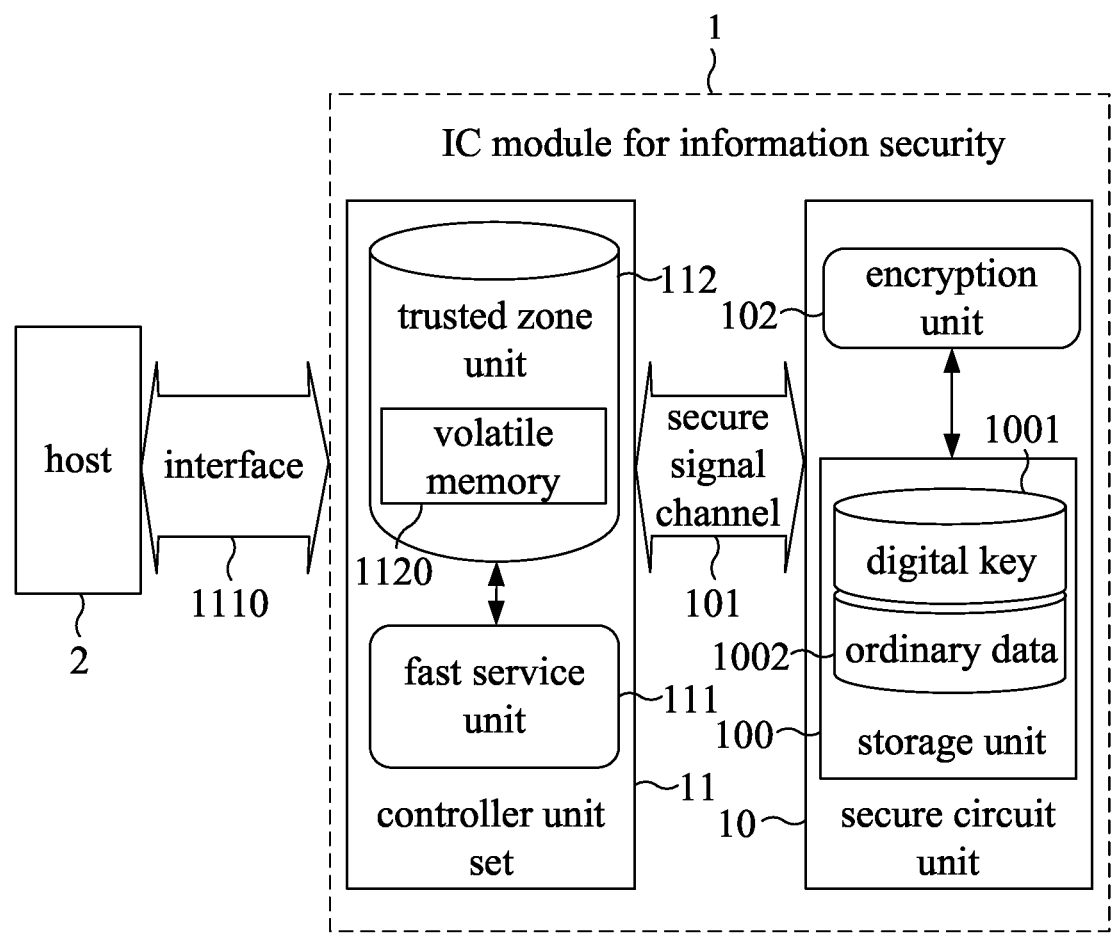
FIG. 1 is a functional block diagram of an integrated circuit module for information security according to a preferred embodiment of the present invention.

In order to solve the above-mentioned shortcomings of the conventional means, the inventor of the present invention has developed a preferred embodiment of an integrated circuit module for information security, as shown in the schematic functional block diagram of FIG. 1. The IC module 1 for information security according to the present invention mainly includes a security circuit unit 10 and a controller unit set 11. The secure circuit unit 10 is a circuit unit that has passed the secure module verification, e.g., the verifying test of Common Criteria Evaluation Assurance Level 5+, or short named "EAL5+"), and a storage unit 100 therein stores at least one digital key 1001 and ordinary digital information 1002. The digital key 1001 is used for conducting digital key services. The digital key services may be functions of cryptographic services, key management, data storage, and so on. The secure circuit unit 10 may further include an encryption unit 102 for providing necessary encryption/decryption services. Its processing speed, however, is not fast enough. Therefore, a fast service unit 111 is additionally developed according to the present invention to make improvement.

Thus, the controller unit set 11 developed according to the present invention mainly includes the fast service unit 111 and a trusted zone unit 112. The trusted zone unit 112 and the secure circuit unit 10 respectively use a first channel establishment key and a second channel establishment key, which are dependent on each other, to establish a secure signal channel 101. The secure circuit unit 10 uses the secure signal channel 101 to transmit a specific data to the fast service unit 111. The fast service unit 111 uses the specific data to conduct, with a host 2, a fast service 1110 via a changeable interface. The fast service unit 111 may be implemented with an artificial intelligence (AI) chip, a field programmable gate array (FPGA) unit, or other types of application specific integrated circuit (ASIC) for conduct a fast service 1110 via a changeable interface with the host 2. The specific data, for example, may include a key for fast service. The key for fast service is originally well preserved in the secure circuit unit 10. Examples of the key for fast service include an identity key indicating a specific identity, e.g., a client of an online bank, a cryptocurrency account password, or a key for encrypting a confidential document. Accordingly, the fast service 1110 may be a fast log-in operation, information encryption/decryption such as AES encryption/decryption, and digital signature production and signature verification, by way of the key for fast service. The fast service unit 111 is disposed with a specific hardware circuit for fast information encryption/decryption, e.g., AES encryption/decryption and digital signature production and signature verification, for promoting the encryption/decryption processing speed of the entire IC module 1 for information security. Furthermore, by way of the following technical means, reliability of the information security of the IC module 1 can be extended to the fast service unit 111. The dependent first channel establishment key and second channel establishment key have a specific relationship. The simplest one is that both are identical, or there is a function/mapping relationship therebetween.

Figure 2A:
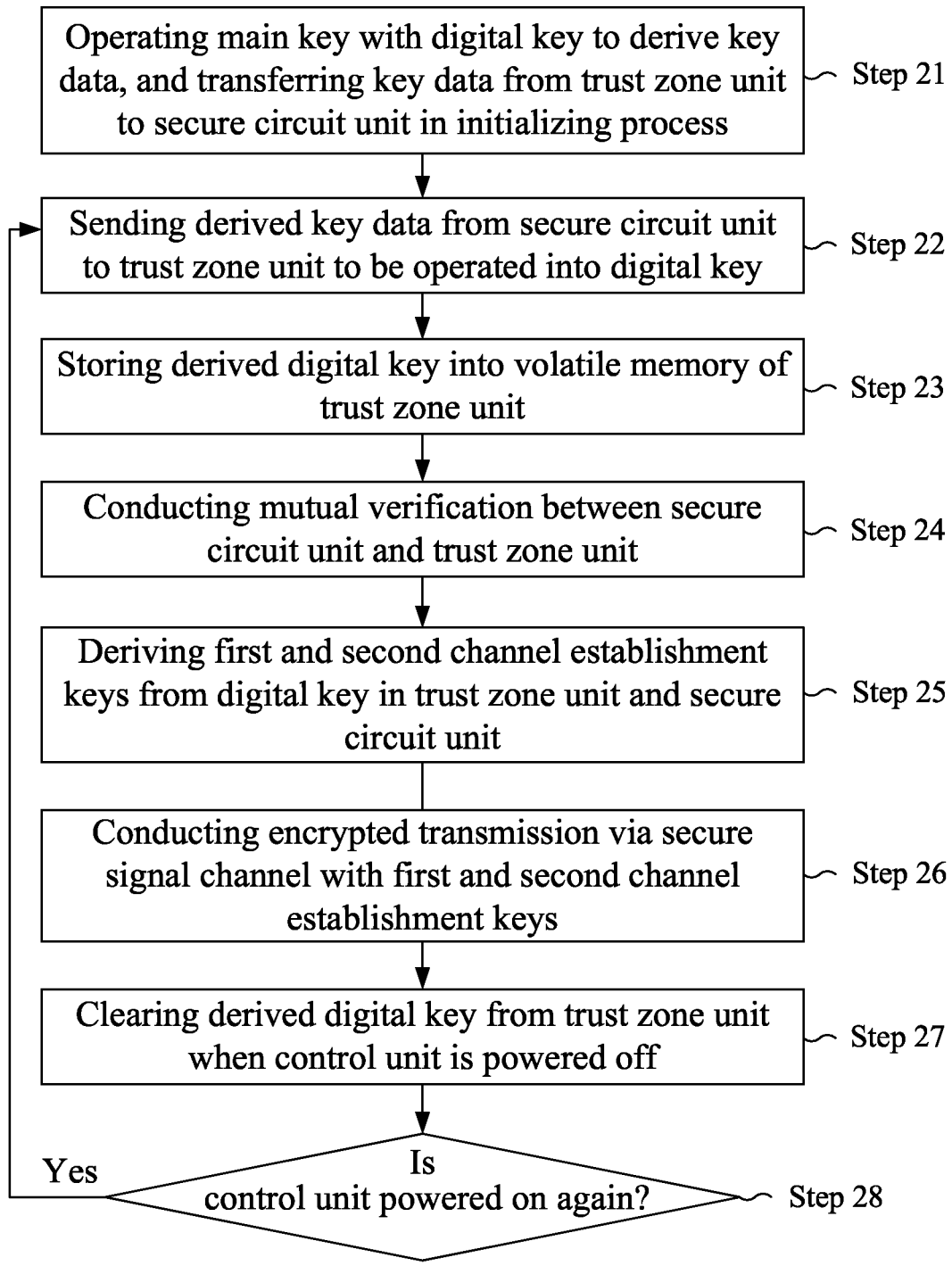
FIG. 2A is a flowchart illustrating a process of establishing a secure signal channel according to the present invention.

A process of establishing the above-described secure signal channel 101 is exemplified by further referring to the flowchart shown in FIG. 2A. First of all, the trusted zone unit 112 in the controller unit set 11 can use a main key to conduct an initialization process of the digital key provided by the secure circuit unit 10 during a packaging process of the above-described IC module 1 for information security or when the system is reset to factory settings. The initialization process mainly aims to obtain a set of derived data, and the trusted zone unit 112 stores the set of derived data back to the secure circuit unit 10 (Step 21). For example, the set of derived data may be derived and obtained by operating the main key and the digital key. For example, it is a set of data generated after an encryption operation of the digital key with the main key. Furthermore, after the trusted zone unit 112 stores the set of derived data back to the secure circuit unit 10, it will not store the set of derived data in a complete form, or it will delete the set of derived data. The object is that the set of derived data will not be simultaneously stored in the trusted zone unit 112 and the secure circuit unit 10 in a complete form until a secure channel is established. The way of generating the main key by the above-described trusted zone unit 112 may be implemented with the secure technology of Physically Unclonable Function, which is hereinafter so called as PUF. Due to the features of being random, unique, and unable to reproduce, the generated main key plays a chip-fingerprint like role. Therefore, the main key can inherently differ with the chip circuit feature of the trusted zone unit 112, and it is not easy to hack away the main key.

As such, when it is necessary to establish the secure signal channel 101, the secure circuit unit 10 sends the set of derived data back to the trusted zone unit 112 again (Step 22). Accordingly, the trusted zone unit 112 gets back the digital key according to the main key and the set of derived data again, and stores it into a volatile memory 1120 (Step 23). Then the trusted zone unit 112 can use the digital key to conduct mutual verification with the secure circuit unit 10 (Step 24). The trusted zone unit 112 and the secure circuit unit 10, which finish the mutual verification, respectively use the digital key to derive the first channel establishment key and the second channel establishment key, thereby successfully establishing the secure signal channel 101. It can be performed by way of a symmetric-encryption algorithm. As such, the first channel establishment key and the second channel establishment key may be session keys of the same contents (Step 25). Then the secure signal channel 101 can use the session keys to conduct encrypted transmission of the specific data (Step 26). Just as the above example, the specific data may include the key for fast service. The key for fast service is stored in the volatile memory 1120. After the controller unit set 11 is powered off, the digital key stored in the volatile memory 1120 and the key for fast service will disappear (Step 27). In the meantime, the key for fast service is stored only in the better protected secure circuit unit 10. In response to regeneration of the need for another fast service, the process of establishing the secure signal channel 101 can be started again after the controller unit set 11 is powered on again (Step 28).

As for an exemplified process of the above-mentioned mutual verification may include the following steps. A first challenge to the secure circuit unit 10 is issued by the trusted zone unit 112, e.g., the trusted zone unit 112 generates a random number and transmits it to the secure circuit unit 10. The secure circuit unit 10 sends a first response, which is the random number encrypted with the digital key, to the trusted zone unit 112. The trusted zone unit 112 decrypts the first response according to the digital key to get back the random number. Then, whether the random number is the random number initially issued can be determined, thereby performing verification. A second challenge to the trusted zone unit 112 is issued by the secure circuit unit 10, e.g., the secure circuit unit 10 generates another random number and transmits it to the trusted zone unit 112. The second challenge, for example, is another random number generated by the secure circuit unit 10. The trusted zone unit 112 sends a second response to respond to the secure circuit unit 10, which is the another random number encrypted with the digital key, to the secure circuit unit 10. The secure circuit unit 10 decrypts the second response with the digital key to get back the another random number. Then, whether the another random number is the random number initially issued can be determined, thereby performing mutual verification. Of course, the orders of the above-described two challenges may be exchanged.

Figure 2B:
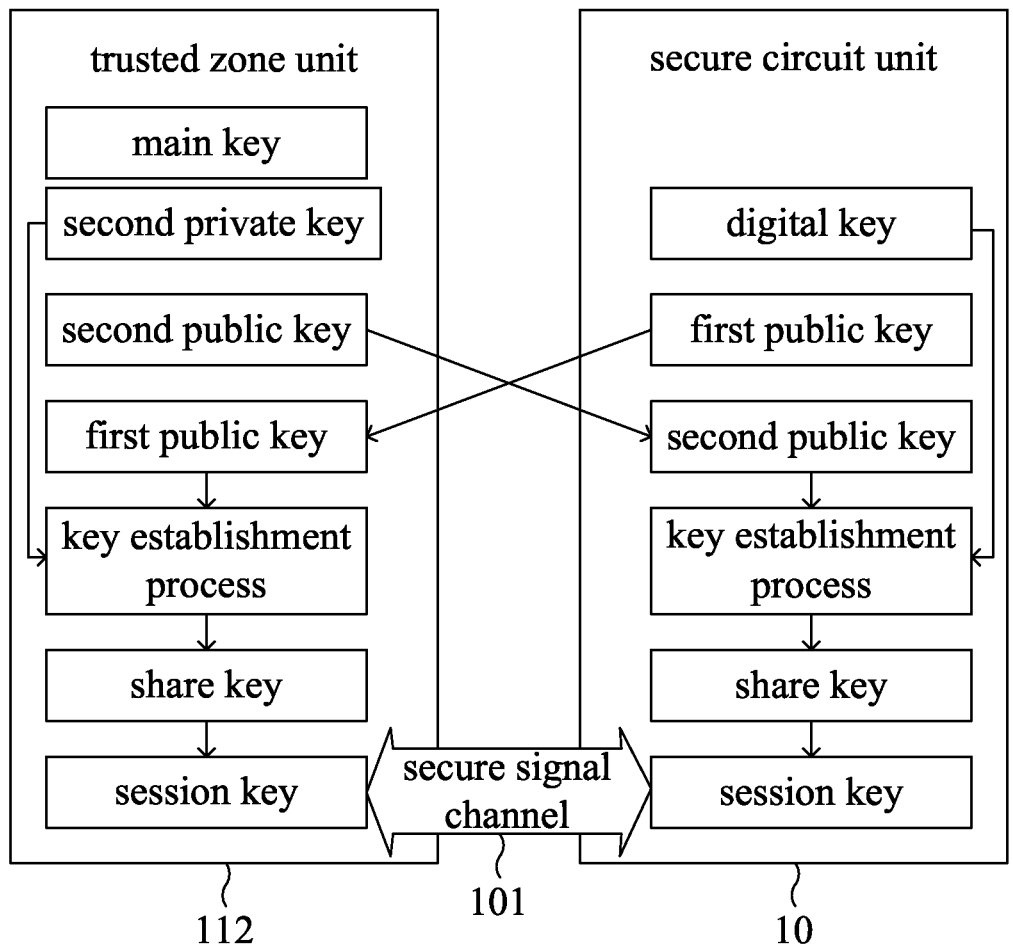
FIG. 2B is a functional block diagram and data exchange scheme illustrating establishment of a secure signal channel by way of another key establishment mechanism according to the present invention.

Furthermore, the present invention may also use other key establishment mechanism to establish the secure signal channel. For example, as shown by the functional blocks and data exchange scheme in FIG. 2B, this embodiment is characterized in that even in the initialization process during manufacturing, the digital key in the secure circuit unit 10 will not be outputted to the external, but only public keys are exchanged. The trusted zone unit 112 can obtain a first public key, which pairs the digital key. Meanwhile, a second public key of a second public-private key pair in the trusted zone unit 112 is sent to the secure circuit unit 10, and stored in the secure circuit unit 10. For securing the second public-private key pair from being hacked, the trusted zone unit 112 may use the PUF-based main key to encrypt the second public-private key pair. Subsequently, a share key is generated by the trusted zone unit 112 according to a key establishment process. The key establishment algorithm, for example, can be Elliptic Curve Diffie-Hellman key exchange (ECDH), by which the share key is derived from the first public key and a second private key of the second public-private key pair. The secure circuit unit 10 may also use the same key establishment process, e.g., ECDH, and derive the share key from the second public key and the digital key. The secure circuit unit 10 and the trusted zone unit 112 then use the share key to derive a session key, which serves as each of the first channel establishment key and the second channel establishment key. The first channel establishment key and the second channel establishment key are session keys of the same contents, and the secure signal channel uses the session keys to conduct symmetric-encryption transmission, e.g., AES encryption. The session keys will disappear as the controller unit set 11 is powered off. Subsequently, when the controller unit set 11 is powered on, the process of establishing the secure signal channel restarts again. The above-described ECDH process may be a type of Elliptic Curve Diffie-Hellman key exchange (2s), which is ECDH (2s) in short. That is, two static keys are used for generating a share key. In other words, the resulting share key will not change, and it is necessary to derive different session keys each time to avoid from cracking. Alternatively, different types of key establishment ways, e.g., ECDH (2s,1e) or ECDH (2s,2e), may also be introduced. By introducing an ephemeral key, different share keys can be generated each time without the derivation operation of the session key, and security of the system can be further improved. Since the above-described ECDH (2s,1e) and ECDH (2s,2e) have been developed to be well known algorithms, they are not redundantly described herein.

As for the secure circuit unit 10, it may be implemented with a commercially available secure element, e.g., SLE 97 produced by Infineon Technologies. The controller unit set 11 may be implemented with an integrated chipset consisting of a single chip or composite chips. The fast service unit 111 may be implemented with an artificial intelligence (AI) chip, a field programmable gate array (FPGA) unit, or other application specific integrated circuit (ASIC) for conducting the fast service 1110 via a changeable interface with the host. In this way, the IC module 1 for information security made by the technical means according to the present invention can exhibit the information security function. Hereinafter, a variety of applications developed with the IC module 1 for information security serving as a core element are introduced. Examples of the above-described fast service 1110 via a changeable interface can be referred to the following descriptions of exemplified applications.

Figure 3A:
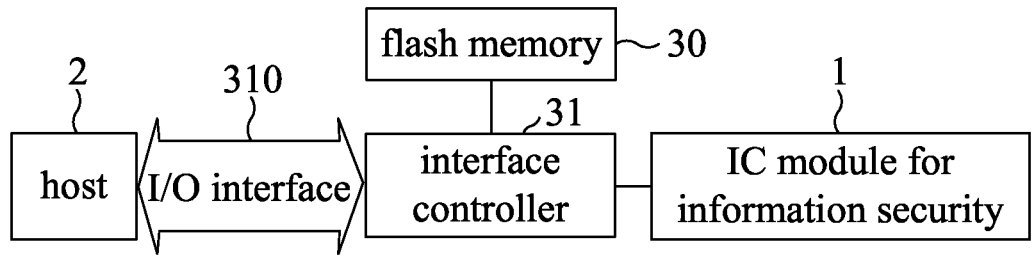
FIGS. 3A, 3B and 3C are functional block diagrams exemplifying three applications of an integrated circuit module for information security according to the present invention in different hardware environments.
Figure 3B:
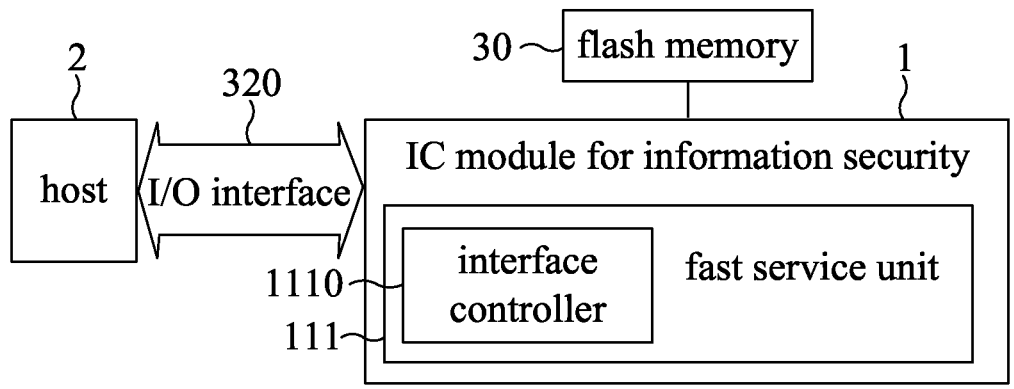
Figure 3C:
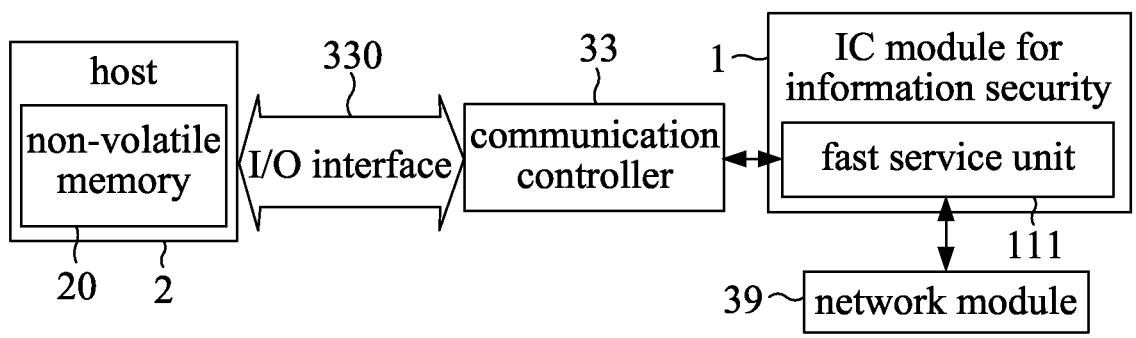

Please refer to FIGS. 3A, 3B and 3C, which illustrate the use of the IC module 1 for information security according to the present invention in different hardware environments. As shown in FIG. 3A, the IC module 1 for information security is in communication with a flash memory 30 via an interface controller 31, which are further integrated into a memory module exhibiting an information security function. The flash memory 30 can be used for storing digital information. For example, if the interface controller 31 is a controller of Secure Digital Memory Card, i.e., SD card controller. Then those shown in FIG. 3A will be able to constitute a SD card or a microSD card exhibiting an information security function. When the SD card or microSD card exhibiting an information security function is inserted into an ordinary card-reader. For example, the host 2 as shown is a computer or a smartphone, and a memory card-reader is coupled thereto. It may be transformed into a USB dongle exhibiting an information security function. For example, if the IC module 1 for information security according to the present invention has passed the verification executed by the fast identity online (FIDO) appliance, the card-reader inserted with the SD card or microSD card exhibiting an information security function can be transformed into a USB dongle exhibiting an information security function, or a security token. The flash memory 30, of course, may be implemented with other types of non-volatile memory, and not to be redundantly described herein.

In this way, the consumer can transform an ordinary card reader into a USB dongle exhibiting an information security function, or a security token, by purchasing the SD card or microSD card exhibiting an information security function, which is developed according to the present invention. By way of easy installation, information encryption/decryption functions can be achieved. Furthermore, the interface controller 31 may also be directly implemented with a USB controller. Accordingly, the circuit blocks shown in FIG. 3A may be integrated into one housing to directly form a USB dongle exhibiting an information security function, and communicable with the host 2 via the I/O interface 310, i.e., the USB interface herein. Likewise, if the IC module 1 for information security according to the present invention has passed the verification executed by the fast identity online (FIDO) appliance, a USB token passing the verification executed by the fast identity online (FIDO) appliance can be obtained with the IC module 1 for information security serving as a core and integrated therewith an ordinary USB interface controller.

After the I/O interface 310, e.g., the above-described microSD card interface or a USB interface, of the interface controller 31 accomplish communication with the host 2, the host 2 can communicate with the IC module 1 for information security and the flash memory 30 by way of a microSD card protocol or a USB protocol. Furthermore, the data stored in the flash memory 30 can have the encryption service from the IC module 1 for information security.

As shown in FIG. 3B, an interface controller 1110 is integrated into the fast service unit 111. Accordingly, the flash memory 30 is in communication with the host 2 via an I/O interface 320 provided by the fast service unit 111 of the IC module for information security. Installation of the interface controller 31 shown in FIG. 3A can thus be omitted. For example, in consideration of simplicity of material preparation, the fast service unit 111 may be implemented with an FPGA unit. By way of programming settings to adjust functions so as to accomplish the interface control functions of a USB, a peripheral component interconnect express (PCIe), an integrated drive electronics (IDE), a serial advanced technology attachment (SATA), or a small computer system interface (SCSI). The flash memory 30 may further be integrated with the IC module 1 for information security in the same housing, thereby directly constituting a portable secure SSD exhibiting an information security function. Of course, the fast service unit 111 may also be implemented with an ASIC, which is lower in cost and poorer in function.

As shown in FIG. 3C, it is a hardware module exhibiting an information security function with the IC module 1 for information security serving as a core. The fast service unit 111 in the IC module 1 for information security is communicable with the host 2 via an I/O interface 330 directly provided by a communication controller 33, which is implemented with an ASIC, an FPGA unit or a system on a chip (SoC). The communication controller 33 may be a network interface card controller, and the IC module 1 for information security may further be connected to a network module 39 for communication with an external internet (not shown) or mobile network (not shown). Accordingly, data information transmitted between the host 2 and a user device (not shown) at the other end of the internet or mobile network are encrypted/decrypted by way of the IC module 1 for information security. With the installation of the fast service unit 111, performance can be further improved. In this way, what is shown in FIG. 3C can directly constitute a network communication device exhibiting an information security function, e.g., a voice over internet protocol (VoIP) device exhibiting information security and encryption/decryption functions, or a virtual private network (VPN) device exhibiting information security and encryption/decryption functions.

Of course, the communication controller 33 may also be implemented with a PCI-E bus controller, and may also be a USB, IDE, SATA or SCSI interface controller. Accordingly, as shown in FIG. 3C, the integrated IC module 1 for information security and communication controller 33 in one housing (not shown), a hardware security module (HSM) exhibiting information security and encryption/decryption functions can be obtained. Then it is not necessary to install the network module 39 in the HSM. Since the IC module 1 for information security can communicate with the non-volatile memory 20 in the host 2 for digital data transmission via the communication controller 33, the unencrypted data stored in the non-volatile memory 20 can be transmitted by the host to the fast service unit 111 in the IC module 1 via the communication controller 33 to be encrypted. The encrypted data is then transmitted back to the non-volatile memory 20 in the host 2 via the communication controller 33 to be stored. On the other hand, the host 2 sends the encrypted data stored in the non-volatile memory 20 to the fast service unit 111 in the IC module 1 for information security via the communication controller 33 to be decrypted. The decrypted data is then transmitted back to the non-volatile memory 20 in the host 2 via the communication controller 33 to be stored or for other uses, e.g., shown on a display. In this way, the host 2 can be transformed into a network attached storage (NAS) exhibiting an information security function. The fast service as described above can be used to conduct fast encryption or decryption of the transmitted or received data by using various session keys derived from the digital key properly stored in the IC module 1 for information security, or to perform fast digital signature production and signature verification.

In summary, although the present invention is disclosed by way of embodiments as described above, it is not intended to limit the present invention. The invention may be modified and embellished to the extent that it is within the spirit and scope of the technology of the invention. Therefore, the scope of protection of the present invention shall be subject to the scope of the patent application as defined in the attached claims.

DESCRIPTION OF LABELLING

1: integrated circuit module for information security
10: secure circuit unit
11: controller unit set
100: storage unit
1001: digital key
1002: digital information
102: encryption unit
111: fast service unit
112: trusted zone unit
101: secure signal channel
1110: fast service via changeable interface
1120: volatile memory
30: flash memory
31: interface controller
310: I/O interface
2: host
320: I/O interface
33: communication controller
330: I/O interface
39: network module

What is claimed is:

1. An integrated circuit module for information security, comprising:

a secure circuit unit, having passed a security evaluation as a cryptographic module and storing therein at least one digital key for providing a digital key service; and a controller unit set in communication with the secure circuit unit, including a fast service unit and a trusted zone unit, wherein the trusted zone unit and the secure circuit unit respectively use a first channel establishment key and a second channel establishment key, which are dependent on each other, to establish a secure signal channel, and the secure circuit unit transmits a specific data to the fast service unit via the security signal channel to perform a fast service, wherein the first channel establishment key and the second channel establishment key are derived from the digital key, and wherein the trusted zone unit includes a volatile memory; after the trusted zone unit uses a main key to perform an initialization process with the digital key provided by the secure circuit unit, and after a set of derived data is obtained from the digital key and the main key and stored back to the secure circuit unit, the secure circuit unit sends the set of derived data to the trusted zone unit in a subsequent process of establishing the secure signal channel, and the trusted zone unit uses the main key and the set of derived data to restore the digital key and stores it in a volatile memory; after the trusted zone unit completes mutual verification with the secure circuit unit by way of the digital key, the trusted zone unit and the secure circuit unit use the digital key to derive the first channel establishment key and the second channel establishment key respectively; the secure signal channel, by way of the first channel establishment key and the second channel establishment key, has the specific data transmitted therevia under encryption; and the specific data obtained by the trusted zone unit is stored into the volatile memory, wherein after the controller unit set is powered off, the digital key stored in the volatile memory will disappear, and the process of establishing the secure signal channel will be restarted once the controller unit is powered on.

2. The integrated circuit module for information security according to claim 1, wherein the first channel establishment key and the second channel establishment key are session keys of the same contents; the secure signal channel, by way of the session keys, has the specific data transmitted therevia under encryption; and the specific data contains a key for fast service for the fast service unit to perform the fast service.

3. The integrated circuit module for information security according to claim 1, wherein the mutual verification includes steps of: the trusted zone unit issuing a first challenge to the security circuit unit, which is a generated random number, and sending it to the security circuit unit; in response to the first challenge, the security circuit unit sending back a first response to the trusted zone unit, which is the random number encrypted with the digital key; the trusted zone unit decrypting the first response based on the digital key to get back the decrypted random number, thereby determining whether the decrypted random number is the same as the generated random number; the security circuit unit issuing a second challenge to the trusted zone unit, which is another generated random number, and sending it to the trusted zone unit; in response to the second challenge, the trusted zone unit sending back a second response to the security circuit unit, which is the another random number encrypted with the digital key; and the security circuit unit decrypting the second response according to the digital key to get back the decrypted another random number, thereby determining whether the decrypted another random number is the same as the generated another random number, thereby completing the mutual verification.

4. The integrated circuit module for information security according to claim 1, wherein the trusted zone unit uses a secure technology of Physically Unclonable Function (PUF) to generate the main key.

5. The integrated circuit module for information security according to claim 1, wherein the secure circuit unit is a secure integrated circuit chip, and the controller unit set is a controller integrated circuit chipset.

6. The integrated circuit module for information security according to claim 1, wherein the fast service unit is implemented with an AI chip, a field programmable gate array unit, or an application specific integrated circuit (ASIC) for conducting the fast service, which is a fast service via a changeable interface.

7. A memory module exhibiting an information security function, which includes the integrated circuit module for information security as recited in claim 1 and the following devices:
   a non-volatile memory for storing digital information; and
   an interface controller in communication with the non-volatile memory, the integrated circuit module for information security, and a host for conducting digital data transmission between the non-volatile memory and the host, and using the fast service provided by the integrated circuit module for information security.

8. A memory module exhibiting an information security function, comprising: the integrated circuit module for information security as recited in claim 1, and a non-volatile memory for storing digital information, wherein the integrated circuit module for information security is in communication with the non-volatile memory and a host for conducting digital data transmission between the non-volatile memory and the host, and providing the fast service.

9. A hardware module exhibiting an information security function, comprising:
   an integrated circuit module for information security, comprising:
      a secure circuit unit, having passed a security evaluation as a cryptographic module and storing therein at least one digital key for providing a digital key service; and
      a controller unit set in communication with the secure circuit unit, including a fast service unit and a trusted zone unit, wherein the trusted zone unit and the secure circuit unit respectively use a first channel establishment key and a second channel establishment key, which are dependent on each other, to establish a secure signal channel, and the secure circuit unit transmits a specific data to the fast service unit via the security signal channel to perform a fast service; and
   a communication controller in communication with a host for conducting digital data transmission between the integrated circuit module and the host and providing the fast service,
   wherein the communication controller is a network interface controller; the integrated circuit module for information security is further coupled to a network module; the network module is used for communicating with the external internet or mobile network; and data information transmitted between the host and a user device at the other end of the internet or mobile network are encrypted/decrypted by way of the fast service unit in the integrated circuit module for information security.

10. A hardware module exhibiting an information security function, comprising:
   an integrated circuit module for information security, comprising:
      a secure circuit unit, having passed a security evaluation as a cryptographic module and storing therein at least one digital key for providing a digital key service; and
      a controller unit set in communication with the secure circuit unit, including a fast service unit and a trusted zone unit, wherein the trusted zone unit and the secure circuit unit respectively use a first channel establishment key and a second channel establishment key, which are dependent on each other, to establish a secure signal channel, and the secure circuit unit transmits a specific data to the fast service unit via the security signal channel to perform a fast service; and
   a communication controller in communication with a host for conducting digital data transmission between the integrated circuit module and the host and providing the fast service,
   wherein the integrated circuit module for information security and the communication controller are integrated in a housing to form the hardware module exhibiting information security and encryption/decryption functions; the integrated circuit module for information security conducts digital data transmission with a non-volatile memory in the host via the communication controller; the host transmits unencrypted information in the non-volatile memory to the fast service unit in the integrated circuit module for information security to be fast encrypted; the encrypted information is transmitted back to the non-volatile memory in the host via the communication controller to be stored; the host transmits the encrypted information to the fast service unit in the integrated circuit module for information security to be fast decrypted; and the decrypted information is transmitted back to the non-volatile memory in the host via the communication controller to be stored.

11. An integrated circuit module for information security, comprising:
   a secure circuit unit, having passed a security evaluation as a cryptographic module and storing therein at least one digital key for providing a digital key service; and
   a controller unit set in communication with the secure circuit unit, including a fast service unit and a trusted zone unit, wherein the trusted zone unit and the secure circuit unit respectively use a first channel establishment key and a second channel establishment key, which are dependent on each other, to establish a secure signal channel, and the secure circuit unit transmits a specific data to the fast service unit via the security signal channel to perform a fast service,
   wherein the trusted zone unit obtains a first public key pairing the digital key in an initialization process; a second public key of a second public-private key pair in the trusted zone unit is sent to the secure circuit unit, and stored in the secure circuit unit; the trusted zone unit uses a PUF secure technology to generate the main key, and uses the main key to conduct encryption protection of the second public-private key pair; the trusted zone unit uses a key establishment process to derive a share key from the first public key and a second private key of the second public-private key pair; the secure circuit unit uses the key establishment process to derive the share key from the second public key and the digital key; and the secure circuit unit and the trusted zone unit use a session key derived from the shared key to serve as the first channel establishment key and the second channel establishment key.

\* \* \* \* \*